United States Patent
Wänstedt et al.

(10) Patent No.: US 12,063,701 B2
(45) Date of Patent: Aug. 13, 2024

(54) HANDLING OF RADIO RESOURCE BETWEEN TERMINAL DEVICES

(71) Applicant: Telefonaktiebolaget LM Ericsson (PUBL), Stockholm (SE)

(72) Inventors: Stefan Wänstedt, Luleå (SE); Peter Ökvist, Luleå (SE); Iwe Lingström, Kalmar (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 382 days.

(21) Appl. No.: 17/595,209

(22) PCT Filed: May 13, 2019

(86) PCT No.: PCT/SE2019/050425
§ 371 (c)(1),
(2) Date: Nov. 11, 2021

(87) PCT Pub. No.: WO2020/231302
PCT Pub. Date: Nov. 19, 2020

(65) Prior Publication Data
US 2022/0225447 A1    Jul. 14, 2022

(51) Int. Cl.
*H04W 76/14* (2018.01)
*H04W 72/02* (2009.01)
(Continued)

(52) U.S. Cl.
CPC ........... *H04W 76/14* (2018.02); *H04W 72/02* (2013.01); *H04W 72/20* (2023.01); *H04W 92/18* (2013.01)

(58) Field of Classification Search
CPC ..... H04W 76/14; H04W 72/02; H04W 72/20; H04W 92/18
See application file for complete search history.

(56) References Cited

U.S. PATENT DOCUMENTS 9,642,172 B2 *  5/2017  Yamazaki ............. H04W 76/11
9,924,496 B2 *  3/2018  Morita ................ H04W 72/542
(Continued)

FOREIGN PATENT DOCUMENTS

CN        108886767 A      11/2018
EP        3 125 625 A1      2/2017
(Continued)

OTHER PUBLICATIONS

PCT International Search Report issued for International application No. PCT/SE2019/050425—Feb. 7, 2020.
(Continued)

*Primary Examiner* — Jenee Holland
(74) *Attorney, Agent, or Firm* — Baker Botts L.L.P.

(57) ABSTRACT

There is provided mechanisms for requesting radio resources from a second terminal device. A method is performed by a first terminal device. The method comprises identifying an increasing need for use of radio resources. The method comprises transmitting, via a sidelink to the second terminal device, a request for using radio resources allocated to the second terminal device. The method comprises receiving, via the sidelink, a response from the second terminal device. The response pertains to whether the second terminal device has granted the first terminal device to use at least some of the requested radio resources or not. The method comprises providing, towards a network node serving the first terminal device, a notification of that the first terminal device has requested the radio resources from the second terminal device and/or of that the second terminal device has granted the first terminal device to use at least some of the requested radio resources.

20 Claims, 7 Drawing Sheets

(51) Int. Cl.
  *H04W 72/20* (2023.01)
  *H04W 92/10* (2009.01)
  *H04W 92/18* (2009.01)

(56) References Cited

U.S. PATENT DOCUMENTS

| | | | | |
|---|---|---|---|---|
| 2008/0186942 A1* | 8/2008 | Nakayasu | ............. | H04W 72/12 |
| | | | | 370/345 |
| 2009/0201867 A1* | 8/2009 | Teo | ............. | H04L 5/0037 |
| | | | | 455/447 |
| 2009/0265450 A1* | 10/2009 | Helmer | ............. | H04L 41/0893 |
| | | | | 709/221 |
| 2013/0286963 A1 | 10/2013 | Zheng et al. | | |
| 2014/0328306 A1 | 11/2014 | Gao et al. | | |
| 2015/0230226 A1* | 8/2015 | Yoshizawa | ............. | H04W 68/005 |
| | | | | 370/329 |
| 2015/0271249 A1* | 9/2015 | Segre | ............. | G06F 11/00 |
| | | | | 709/217 |
| 2015/0271331 A1* | 9/2015 | Segre | ............. | H04L 67/1001 |
| | | | | 379/265.09 |
| 2015/0271856 A1* | 9/2015 | Tong | ............. | H04W 16/26 |
| | | | | 455/552.1 |
| 2017/0079026 A1* | 3/2017 | Li | ............. | H04W 8/005 |
| 2017/0094653 A1* | 3/2017 | Jitsukawa | ............. | H04W 76/14 |
| 2017/0134999 A1* | 5/2017 | Wu | ............. | H04W 76/14 |
| 2017/0156143 A1* | 6/2017 | Chang | ............. | H04B 17/336 |
| 2017/0181154 A1* | 6/2017 | Zhou | ............. | H04W 4/70 |
| 2017/0230816 A1 | 8/2017 | Chatterjee et al. | | |
| 2017/0285105 A1* | 10/2017 | Uemura | ............. | H04W 72/23 |
| 2017/0295563 A1* | 10/2017 | Ma | ............. | H04W 72/04 |
| 2017/0353433 A1* | 12/2017 | Antony | ............. | H04L 49/70 |
| 2018/0139724 A1 | 5/2018 | Loehr et al. | | |
| 2018/0152920 A1* | 5/2018 | Zhao | ............. | H04W 40/22 |
| 2018/0184272 A1 | 6/2018 | Hehn et al. | | |
| 2018/0184348 A1* | 6/2018 | Uemura | ............. | H04W 48/20 |
| 2019/0037534 A1* | 1/2019 | Yasukawa | ............. | H04W 4/40 |
| 2019/0053251 A1 | 2/2019 | Loehr et al. | | |
| 2021/0144517 A1* | 5/2021 | Guim Bernat | ............. | H04L 41/0869 |
| 2024/0028933 A1* | 1/2024 | Martine | ............. | G06N 7/01 |

FOREIGN PATENT DOCUMENTS

| | | |
|---|---|---|
| EP | 3 301 985 A1 | 4/2018 |
| EP | 3 404 944 A1 | 11/2018 |

OTHER PUBLICATIONS

PCT Written Opinion of the International Searching Authority issued for International application No. PCT/SE2019/050425—Feb. 7, 2020.

Sanjana Vishwanath Manturshettar et al., Dynamic Spectrum Sharing and Resource Allocation for Multicell LTE-A System, 2017 IEEE International Conference on Advanced Networks and Telecommunications Systems (ANTS)—Dec. 17-20, 2017.

3GPP TSG-RAN WG2 #104; Spokane, USA; Source: Huawei, HiSilicon; Title: AS-related group management for platooning (R2-1817459)—Nov. 12-16, 2018.

Extended European Search Report issued for Application No./Patent No. 19929078.4-1215 / 3970427 PCT/SE2019050425—Nov. 7, 2022.

Examination Report issued by Intellectual Property India for Application No. 202147057023—Jun. 29, 2022.

Office Action issued for Chinese Patent Application Serial No. 201980096361.1—Dec. 14, 2023.

Search Report issued for Chinese Application Serial No. 2019800963611—Dec. 12, 2023.

Summary Translation of Office Action issued for Chinese Patent Application Serial No. 201980096361.1—Dec. 14, 2023.

* cited by examiner

HANDLING OF RADIO RESOURCE BETWEEN TERMINAL DEVICES

PRIORITY

This nonprovisional application is a U.S. National Stage Filing under 35 U.S.C. § 371 of International Patent Application Serial No. PCT/SE2019/050425 filed May 13, 2019 and entitled "Handling of Radio Resource Between Terminal Devices", which is hereby incorporated by reference in its entirety.

TECHNICAL FIELD

Embodiments presented herein relate to a method, a first terminal device, a computer program, and a computer program product for requesting radio resources from a second terminal device. Further embodiments presented herein relate to a method, a second terminal device, a computer program, and a computer program product for granting radio resources to a first terminal device. Further embodiments presented herein relate to a method, a network node, a computer program, and a computer program product for handling radio resources between a first terminal device and a second terminal device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is resource scheduling.

Resource handling is commonly handled by the scheduler located in the radio access network node on the network side. The scheduler is configured to apply certain principles to divide radio resources (bandwidth, time slots, etc.) between terminal devices in a cell served by the radio access network node. The scheduler might further be configured to apply multi-cell scheduling policies to balance and mitigate interference and load variations over larger areas than a single cell and in situation where terminal devices not only in its own cell benefit from a jointly optimized resource dispatching approach.

One scheduling principle is Round Robin where the served terminal devices are scheduled according a given queue order, with the constraint of scheduling equal time and resources for each individual terminal device in the queue. Other scheduling mechanisms might consider weight factors and/or different priority levels as assigned to the individual terminal devices as well as the amount of data in transmit buffers and/or radio conditions for each individual terminal device when allocating the resources among the terminal devices.

Despite this, there are few means for an individual terminal device to impact to what extent the scheduler assigns resources to it.

Hence, there is still a need for an improved scheduling of terminal devices in a communications network.

SUMMARY

An object of embodiments herein is to provide mechanisms enabling efficient scheduling of terminal devices in a communications network.

According to a first aspect there is presented a method for requesting radio resources from a second terminal device. The method is performed by a first terminal device. The method comprises identifying an increasing need for use of radio resources. The method comprises transmitting, via a sidelink to the second terminal device, a request for using radio resources allocated to the second terminal device. The method comprises receiving, via the sidelink, a response from the second terminal device. The response pertains to whether the second terminal device has granted the first terminal device to use at least some of the requested radio resources or not. The method comprises providing, towards a network node serving the first terminal device, a notification of that the first terminal device has requested the radio resources from the second terminal device and/or of that the second terminal device has granted the first terminal device to use at least some of the requested radio resources.

According to a second aspect there is presented a first terminal device for requesting radio resources from a second terminal device. The first terminal device comprises processing circuitry. The processing circuitry is configured to cause the first terminal device to identify an increasing need for use of radio resources. The processing circuitry is configured to cause the first terminal device to transmit, via a sidelink to the second terminal device, a request for using radio resources allocated to the second terminal device. The processing circuitry is configured to cause the first terminal device to receive, via the sidelink, a response from the second terminal device. The response pertains to whether the second terminal device has granted the first terminal device to use at least some of the requested radio resources or not. The processing circuitry is configured to cause the first terminal device to provide, towards a network node serving the first terminal device, a notification of that the first terminal device has requested the radio resources from the second terminal device and/or of that the second terminal device has granted the first terminal device to use at least some of the requested radio resources.

According to a third aspect there is presented a computer program for requesting radio resources from a second terminal device. The computer program comprises computer program code which, when run on processing circuitry of a first terminal device, causes the first terminal device to perform a method according to the first aspect.

According to a fourth aspect there is presented a method for granting radio resources to a first terminal device. The method is performed by a second terminal device. The method comprises receiving, via a sidelink to the first terminal device, a request for the first terminal device to use radio resources allocated to the second terminal device. The method comprises transmitting, via the sidelink, a response to the first terminal device. The response pertains to whether the second terminal device has granted the first terminal device to use at least some of the requested radio resources or not. The method comprises providing, towards a network node serving the second terminal device, a notification of that the first terminal device has requested the radio resources from the second terminal device and/or of that the second terminal device has granted the first terminal device to use at least some of the requested radio resources.

According to a fifth aspect there is presented a second terminal device for granting radio resources to a first terminal device. The second terminal device comprises processing circuitry. The processing circuitry is configured to cause the second terminal device to receive, via a sidelink to the first terminal device, a request for the first terminal device to use radio resources allocated to the second terminal device.

The processing circuitry is configured to cause the second terminal device to transmit, via the sidelink, a response to the first terminal device. The response pertains to whether the second terminal device has granted the first terminal device to use at least some of the requested radio resources or not. The processing circuitry is configured to cause the second terminal device to provide, towards a network node serving the second terminal device, a notification of that the first terminal device has requested the radio resources from the second terminal device and/or of that the second terminal device has granted the first terminal device to use at least some of the requested radio resources.

According to a sixth aspect there is presented a computer program for granting radio resources to a first terminal device. The computer program comprises computer program code which, when run on processing circuitry of a second terminal device, causes the second terminal device to perform a method according to the fourth aspect.

According to a seventh aspect there is presented a method for handling radio resources between a first terminal device and a second terminal device. The method is performed by a network node. The method comprises obtaining, from a least one of the first terminal device served by the network node and the second terminal device served by the network node, a notification of that the first terminal device has requested radio resources from the second terminal device where the radio resources have been allocated to the second terminal device, and/or of that the second terminal device has granted the first terminal device to use at least some of the requested radio resources. The method comprises transmitting, to at least one of the first terminal device and the second terminal device, a decision pertaining to whether the network node has accepted the at least some of the requested radio resources to be granted the first terminal device or not.

According to an eight aspect there is presented a network node for handling radio resources between a first terminal and a second terminal device. The network node comprises processing circuitry. The processing circuitry is configured to cause the network node to obtain, from a least one of the first terminal device served by the network node and the second terminal device served by the network node, a notification of that the first terminal device has requested radio resources from the second terminal device where the radio resources have been allocated to the second terminal device, and/or of that the second terminal device has granted the first terminal device to use at least some of the requested radio resources. The processing circuitry is configured to cause the network node to transmit, to at least one of the first terminal device and the second terminal device, a decision pertaining to whether the network node has accepted the at least some of the requested radio resources to be granted the first terminal device or not.

According to a tenth aspect there is presented a computer program for handling radio resources between a first terminal device and a second terminal device, the computer program comprising computer program code which, when run on processing circuitry of a network node, causes the network node to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously these methods, these first terminal devices, these second terminal devices, these network nodes, these computer programs, and this computer program product enable efficient scheduling of terminal devices in a communications network.

Advantageously these methods, these first terminal devices, these second terminal devices, these network nodes, these computer programs, and this computer program product enable cell capacity, as given by the radio resources, to be traded between different terminal devices in a communications network.

In turn, this enables efficient utilization of available radio resource in the communications network.

In turn, this enables a terminal device to obtain more radio resources than given by the scheduling policy followed by the network node.

Advantageously these methods, these first terminal devices, these second terminal devices, these network nodes, these computer programs, and this computer program product enable the scheduling of radio resources to a terminal device to be adapter faster than if the scheduling were to be updated by means of a quality of service (QoS) policy update and/or change of subscription policy.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, there is a need for an improved scheduling of terminal devices in a communications network.

In more detail, there are currently no means for terminal devices to initiate trade, or redistribution, of their already scheduled radio resources. In a scenario where a terminal device has a need for extra radio resource within certain hours, etc., and another terminal device in the same cell has scheduled radio resources to spare for the same certain hours, there is currently no means for the radio resources to be traded, or redistributed, among these two terminal devices (optionally exchanging some sort of payment/remuneration).

Although QoS schemes seemingly are designed for such scenarios and thus how this matter should be addressed, i.e. where there are QoS models that assign different scheduling weights and priorities to different terminal devices depending on their current buffer status and radio environment, given a certain subscription, scheduling in the above scenario is not easily executed.

Figure 1:
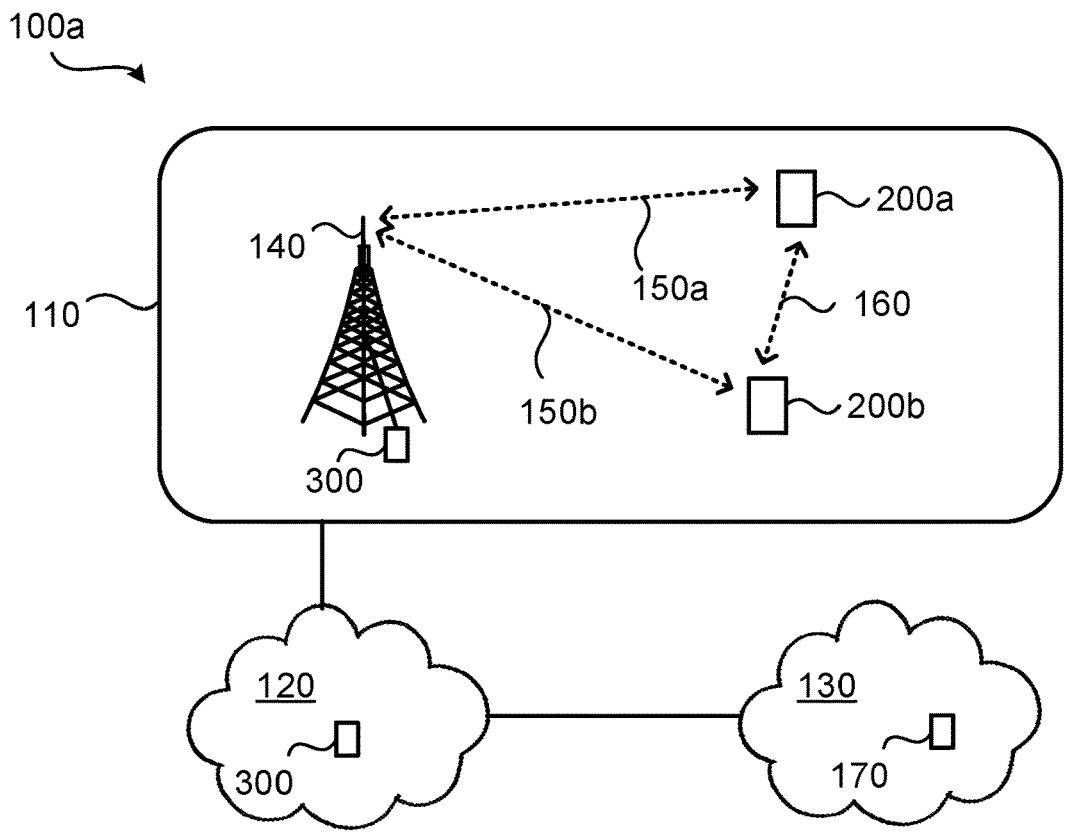
FIGS. 1 and 2 are schematic diagrams illustrating a communications network according to embodiments.

FIG. 1 is a schematic diagram illustrating a communications network bow where embodiments presented herein can be applied. The communications networks bow, could be a third generation (3G) telecommunications network, a fourth generation (4G) telecommunications network, or a fifth (5G) telecommunications network, or any combination thereof, and support any 3GPP telecommunications standard, where applicable.

The communications network bow comprises a radio access network 110, a core network 120, and a service network 130, which are interconnected with each other. In turn, the radio access network 110 comprises a radio access network node 140 configured to provides network access to terminal devices 200a, 200b within the cell served by the radio access network node 140, thus enabling the terminal device 200a, 200b to communicate with over a wireless link 150a, 150b. The terminal devices 200a, 200b are thereby enabled to, via the radio access network node 140, access services of, and exchange data with, the service network 130.

Operation of the radio access network node 140 is controlled by a network node 300. The network node 300 could be part of, integrated with, collocated with, or physically separated from, the radio access network node 140. The terminal devices 200a, 200b are further configured to communicate directly with each other over a wireless sidelink 160. As will be further disclosed below, the wireless sidelink 160 is facilitated by a proximity-based services (ProSe) as provided by a ProSe server 170.

Examples of radio access network nodes 140 are radio base stations, base transceiver stations, Node Bs (NBs), evolved Node Bs (eNBs), gNBs, access points, and access nodes, and backhaul nodes. Examples of terminal devices 200a, 200b are wireless devices, mobile stations, mobile phones, handsets, wireless local loop phones, user equipment (UE), smartphones, laptop computers, tablet computers, network equipped sensors, network equipped vehicles, machine type communication (MTC) devices, and so-called Internet of Things (IoT) devices. As the skilled person the communications network 100a might comprise a plurality of radio access network nodes 140 providing network access to a plurality of terminal devices 200a, 200b.

Hereinafter, terminal device 200a is denoted a first terminal device and terminal device 200b is denoted a second terminal device. However, this notation is for simplifying the description and does not necessarily impose a hierarchical relation between these terminal devices 200a, 200b.

Figure 2:
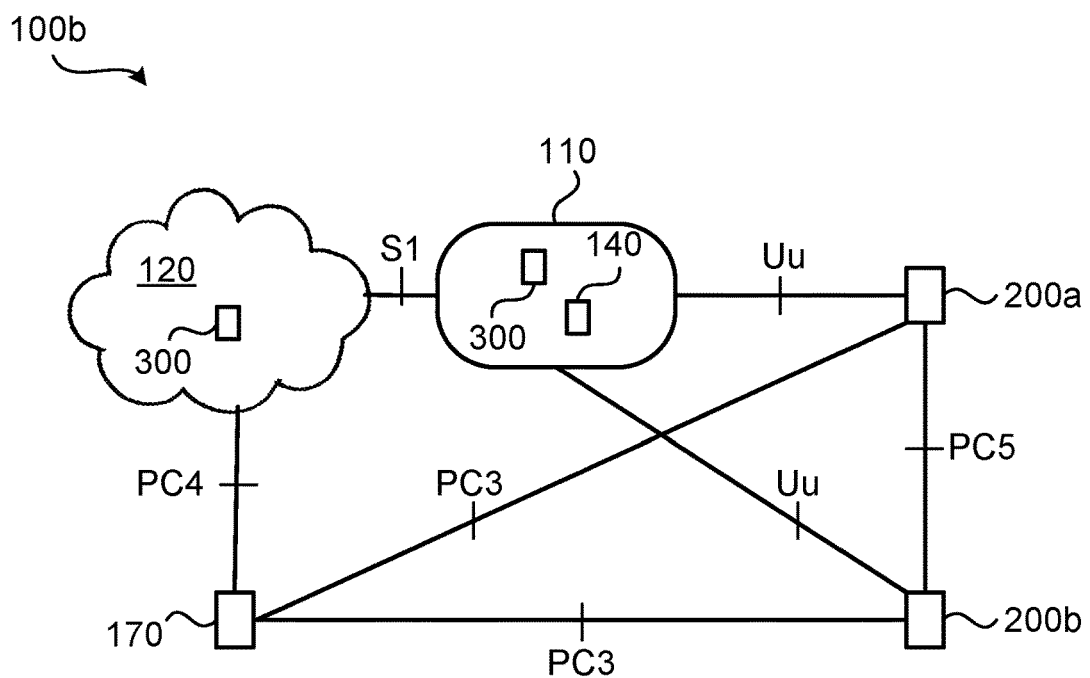

FIG. 2 is a schematic diagram illustrating a communications network 100b showing the communications interfaces between the entities of the communications network 100a of FIG. 1. The first terminal device 200a and the second terminal device 200b communicate with each other over communication interface PC5, the first terminal device 200a and the second terminal device 200b communicate with the radio access network (including the radio access network node 140 and possibly the network node 300) over communication interface Uu, and the first terminal device 200a and the second terminal device 200b communicate with the ProSe server 170 over communication interface PC3. That is, the sidelink 160 is established over the PC5 interface, and the wireless links 150a, 150b are established over the Uu interface. For 3GPP Release 12 and onwards, the PC5 interface is a one-to-many communication interface, i.e. it is specified for group communication. From a higher protocol layer perspective (e.g., higher layer than protocol layer 1; the physical layer), this is reflected in the assignment of destination identities (IDs), which according to the ProSe functionality are always group IDs. The Internet Protocol (IP) address of the ProSe server 170 might be preconfigured (hard-coded) in the terminal device 200a, 200b. Alternatively, the terminal device 200a, 200b identify the IP address of the ProSe server 170 via a domain name server (DNS) look-up. To contact the ProSe server 170 the terminal device 200a, 200b have to establish a radio resource control (RRC) connection with the network node over the Uu interface. The radio access network (including the radio access network node 140 and possibly the network node 300) communicates with the core network 120 (possibly including the network node 300) over communication interface S1, and the core network 120 (possibly including the network node 300) communicates with the ProSe server 170 over communication interface PC4. As the skilled person understands, these are just examples of communication interfaces and the entities of FIGS. 1 and 2 might be configured to communicate with each other using other communication interfaces, depending on the actual implementation of the communications network 100a, 100b, for example with regards to which telecommunications standard is to be supported (e.g., Long Term Evolution (LTE), New Radio (NR), etc.).

Among a group of terminal devices 200a, 200b served by the network node 300, although the network node 300 does not consider the need of the individual terminal devices 200a, 200b other than fulfilling a configured scheduling policy, there might be a need for some of the served terminal devices 200a, 200b that requires the terminal device to use more than its scheduled radio resources.

To make this feasible among the group of terminal devices 200a, 200b, it is according to the present disclosure proposed that at least two terminal devices 200a, 200b perform a negotiation of radio resources over a sidelink 160.

The communication over the sidelink 160 is an example of device to device (D2D) communication. D2D communication can be used to support ProSe. Typical applications range from public safety, traffic control/safety and commercial services like proximity based social networking, gaming, and advertisements for by-passers. The network node 300 indicates support of sidelink communication with the presence of system information block 18 (SIB18).

ProSe can be provided when terminal devices supporting such services are within direct communication capabilities range of each other. Examples of ProSe services are ProSe Direct Discovery (according to which terminal devices 200a, 200b in proximity of each other are identified; for two terminal devices 200a, 200b within cellular coverage it may also be used for other commercial purposes), and ProSe Direct Communication between two terminal devices. Radio resources from cellular traffic are reserved and used for this type of communication or enables communication in areas without cellular coverage.

In this context the sidelink 160 is used for ProSe Direct Discovery and Prose Direct communication between terminal devices 200a, 200b and the sidelink 160 corresponds to the communication between two ProSe enabled terminal devices 200a, 200b. The sidelink communication describes the channel structure consisting of Logical, Transport and physical channels over the air interface to realize a ProSe application (see, interface PC5 in FIG. 2).

The embodiments disclosed herein relate to mechanisms for handling radio resources between a first terminal device 200a and a second terminal device 200b. In order to obtain such mechanisms there is provided a first terminal device 200a, a method performed by the first terminal device 200a, a computer program product comprising code, for example in the form of a computer program, that when run on processing circuitry of the first terminal device 200a, causes the first terminal device 200a to perform the method. In order to obtain such mechanisms there is further provided a second terminal device 200b, a method performed by the second terminal device 200b, and a computer program product comprising code, for example in the form of a computer program, that when run on processing circuitry of the second terminal device 200b, causes the second terminal device 200b to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 3:
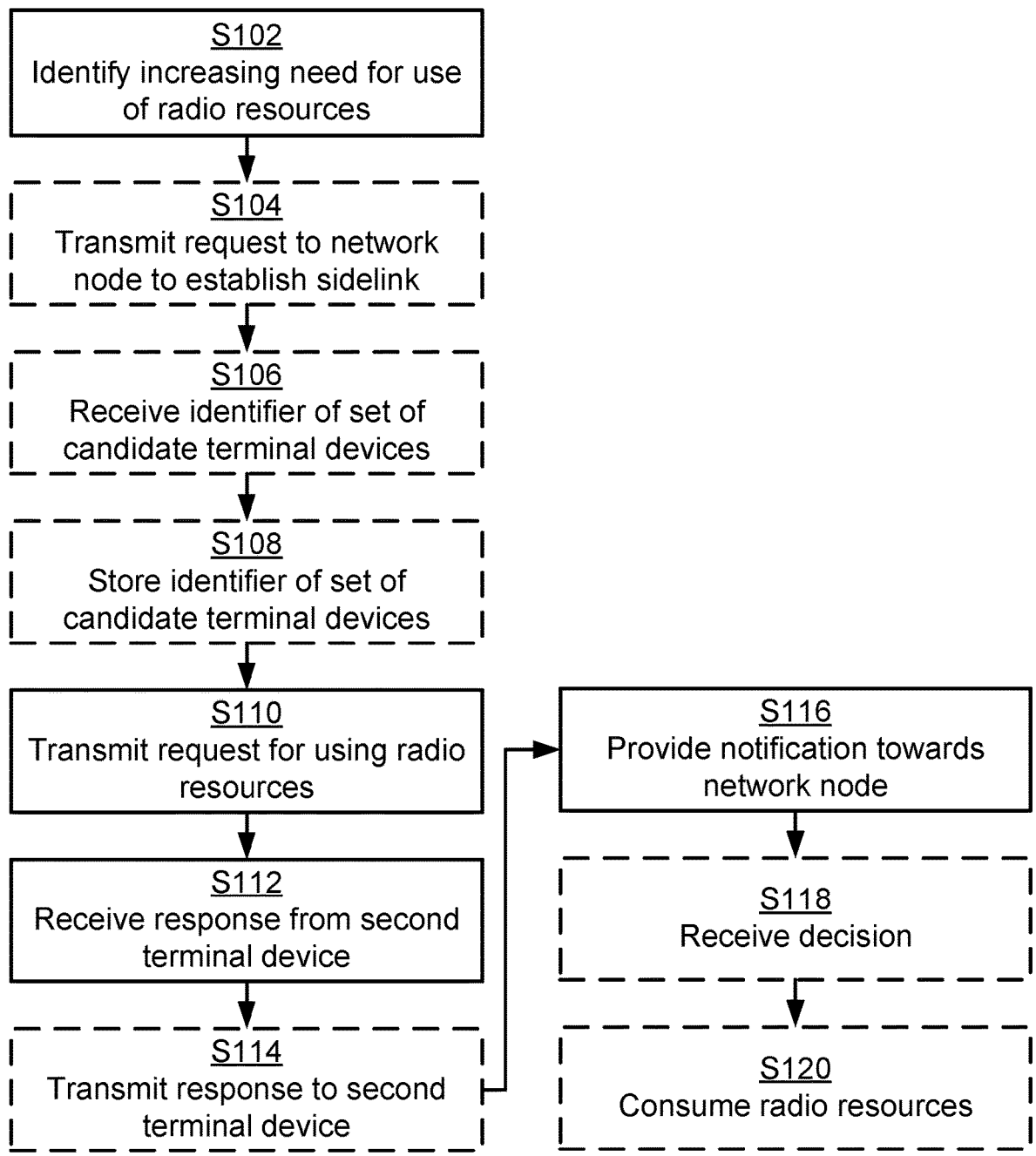
FIGS. 3, 4, and 5 are flowcharts of methods according to embodiments.

Reference is now made to FIG. 3 illustrating a method for requesting radio resources from a second terminal device 200b as performed by the first terminal device 200a according to an embodiment.

S102: The first terminal device 200a identifies an increasing need for use of radio resources.

In this respect, although a terminal device, such as the first terminal device 200a, itself might identify an increasing need for use of radio resources, the actual allocation, or scheduling, of radio resources for each terminal device 200a, 200b is handled by the scheduler of the network node 300 serving the terminal devices 200a, 200b. Examples of causes for the increasing need for use of radio resources will be given below. The first terminal device 200a then requests extra radio resource from a peer terminal device, exemplified by the second terminal device 200b.

S110: The first terminal device 200a transmits, via a sidelink 160 to the second terminal device 200b, a request for using radio resources allocated to the second terminal device 200b.

It is assumed that the second terminal device 200b responds to the first terminal device 200a.

S112: The first terminal device 200a receives, via the sidelink 160, a response from the second terminal device 200b, the response pertaining to whether the second terminal device 200b has granted the first terminal device 200a to use at least some of the requested radio resources or not.

A notification is then provided towards the network node 300 serving the first terminal device 200a.

S116: The first terminal device 200a provides, towards a network node 300 serving the first terminal device 200a, a notification of that the first terminal device 200a has requested the radio resources from the second terminal device 200b and/or of that the second terminal device 200b has granted the first terminal device 200a to use at least some of the requested radio resources.

Different examples of how the notification might be provided towards the network node 300 will be provided below.

Embodiments relating to further details of requesting radio resources from a second terminal device 200b as performed by the first terminal device 200a will now be disclosed.

In some examples the sidelink 160 is established over interface PC5.

In some examples the radio resources are to be consumed by the first terminal device 200a for enabling cellular communication with the network node 300 serving the first terminal device 200a.

There could be different causes for the increasing need for use of radio resources. In some examples the increasing need is caused by a comparatively large amount of uplink data to be transmitted by the first terminal device 200a towards the network node 300. In some examples the increasing need is caused by a comparatively large amount of downlink data to be transmitted to the first terminal device 200a from the network node 300. In some examples the increasing need is caused by a need for a comparatively high level of quality of service required by a certain network service which the first terminal device 200a is to use. There could be different network services where the large amount of data (uplink or downlink) and high level of quality of service is needed. One example of such a network service is mission critical (MC) services or other types of emergency, rescue, or investigation, services.

In some examples the increasing need for use of radio resources pertains to a certain amount of radio resources and/or a certain amount of time when the radio resources are needed for consumption by the first terminal device 200a. For example, the need could be specified in terms of a certain amount of physical resource blocks, symbols, bits, bandwidth, etc.

In some aspects the sidelink 160 is not already established when the first terminal device 200a identifies the increasing need for use of radio resources. The sidelink 160 then needs to be established before the request in S110 is transmitted. According to an embodiment the first terminal device 200a is therefore configured to perform (optional) step S104:

S104: The first terminal device 200a transmits, to the network node 300, a request to establish the sidelink 160.

The first terminal device 200a would then receive a response from the network node 300 to establish the sidelink 160.

In some aspects the request to establish the sidelink 160 includes information of the network service for which the radio resource are to be used by the terminal device 200. Particularly, according to an embodiment, the request in S104 to establish the sidelink 160 comprises an indication of which network service the increasing need for use of radio resources results from.

In some aspects the first terminal device 200a stores information of its previous sessions (e.g. considered sufficiently successful) so that reliable and fair second terminal devices 200b could be addressed first when seeking to establish the sidelink 160.

The first terminal device 200a could then in its request to the serving network node 300 for a sidelink transmission include a request for the network node 300 to contact a list of preferred second terminal devices 200b for establishment of the sidelink 160. In particular, according to an embodiment the first terminal device 200a is configured to perform (optional) step S106:

S106: The first terminal device 200a receives, from the network node 300, an identifier of a set of candidate terminal devices to which the sidelink 160 can be established. The second terminal device 200b is then selected from the set of candidate terminal devices.

The identifier of the set of candidate terminal devices might be stored for future use, for example when a need for further radio resources is identified. In particular, according to an embodiment the first terminal device 200a is configured to perform (optional) step S108:

S108: The first terminal device 200a stores the identifier of the set of candidate terminal devices.

In other aspects the request includes a list of non-preferred second terminal devices 200b with which establishment of the sidelink is to, if possible, be avoided. The first terminal device 200a might store also this list such that when a need for further radio resources is identified it is avoided to establish a sidelink 160 to any of these non-preferred second terminal devices 200b.

In some aspects the response in S112 from the second terminal device 200b includes information of the amount of offered radio resources and/or of the time duration during which the offered radio resources might be used by the first terminal device 200a. In particular, according to an embodiment, the response from the second terminal device 200b comprises information of amount of the radio resources granted to the first terminal device 200a and/or for how long time the radio resources are granted to the first terminal device 200a.

The notification in S116 to the network node 300 might then include information of the amount of offered radio resources and/or of the time duration during which the offered radio resources might be used by the first terminal device 200a. In particular, according to an embodiment, the notification in S116 provided towards the network node 300 comprises this information.

In some aspects the offer comprises details of payment/remuneration between the first terminal device 200a and the second terminal device 200b. The terminal devices 200a, 200b could then reach an agreement on payment/remuneration with regards to an over-the-top application, or a peer-to-peer application for payment/remuneration, for the radio resources to be transferred from the second terminal device 200b to the first terminal device 200a. In particular, according to an embodiment, the request in S110 comprises an offer for using radio resources allocated to the second terminal device 200b and the first terminal device 200a is configured to perform (optional) step S114:

S114: The first terminal device 200a transmits, via the sidelink 160, a response to the second terminal device 200b. The response comprises at least a partial acceptance of the offer.

The notification in S116 to the network node 300 might then include information of acceptance of the offer. In particular, according to an embodiment, the notification in S116 provided towards the network node 300 comprises the at least partial acceptance of the offer.

In some aspects, payment/remuneration between the first terminal device 200a and the second terminal device 200b is additionally or alternatively handled via, or supervised by, the network node 300 and/or an Operational Support System (OSS) or Business Support System (BSS) in the communications network 100a, 100b.

There could be different ways for the first terminal device 200a to provide the notification in S116. Different aspects relating thereto will now be disclosed in detail.

According to a first aspect the notification is in S116 provided by being transmitted directly to the network node 300, without being transmitted via the second terminal device 200b. That is, according to an embodiment, the notification is in S116 provided towards the network node 300 by being transmitted directly to the network node 300 from the first terminal device 200a.

In this case the notification might comprise an encrypted, or otherwise protected, secret, such as a key, that is shared by the network node 300 and the second terminal device 200b but not known by the first terminal device 200a that will ensure the network node 300 that the second terminal device 200b has agreed to offer the requested radio resources to the first terminal device 200a. That is, according to an embodiment, the response from the second terminal device 200b comprises a protected secret shared by the network node 300 and the second terminal device 200b but not known by the first terminal device 200a, and the notification in S116 comprises the protected secret.

According to a second aspect the notification is in S116 provided by being transmitted to the network node 300 via the second terminal device 200b. That is, according to an embodiment the notification is in S116 provided towards the network node 300 by being transmitted to the second terminal device 200b for forwarding therefrom to the network node 300.

In this case the notification might comprise an encrypted, or otherwise protected, secret, such as a key, that is shared by the network node 300 and the first terminal device 200a but not known by the second terminal device 200b that will ensure the network node 300 that the first terminal device 200a has agreed to the offer of the requested radio resources as given by the second terminal device 200b. That is, according to an embodiment, the notification in S116 comprises a protected secret shared by the network node 300 and the first terminal device 200a but not known by the second terminal device 200b.

As will be further disclosed below, the network node 300 determines whether to accept or reject the at least some of the requested radio resources to be granted to the first terminal device 200a. Particularly, according to an embodiment the first terminal device 200a is configured to perform (optional) step S118:

S118: The first terminal device 200a receives, from the network node 300, a decision pertaining to whether the network node 300 has accepted the at least some of the requested radio resources to be granted the first terminal device 200a or not.

The first terminal device 200a is then configured to act accordingly. Particularly, according to an embodiment the first terminal device 200a is configured to perform (optional) step S120:

S120: The first terminal device 200a consumes the at least some of the requested radio resources according to the decision.

Figure 4:
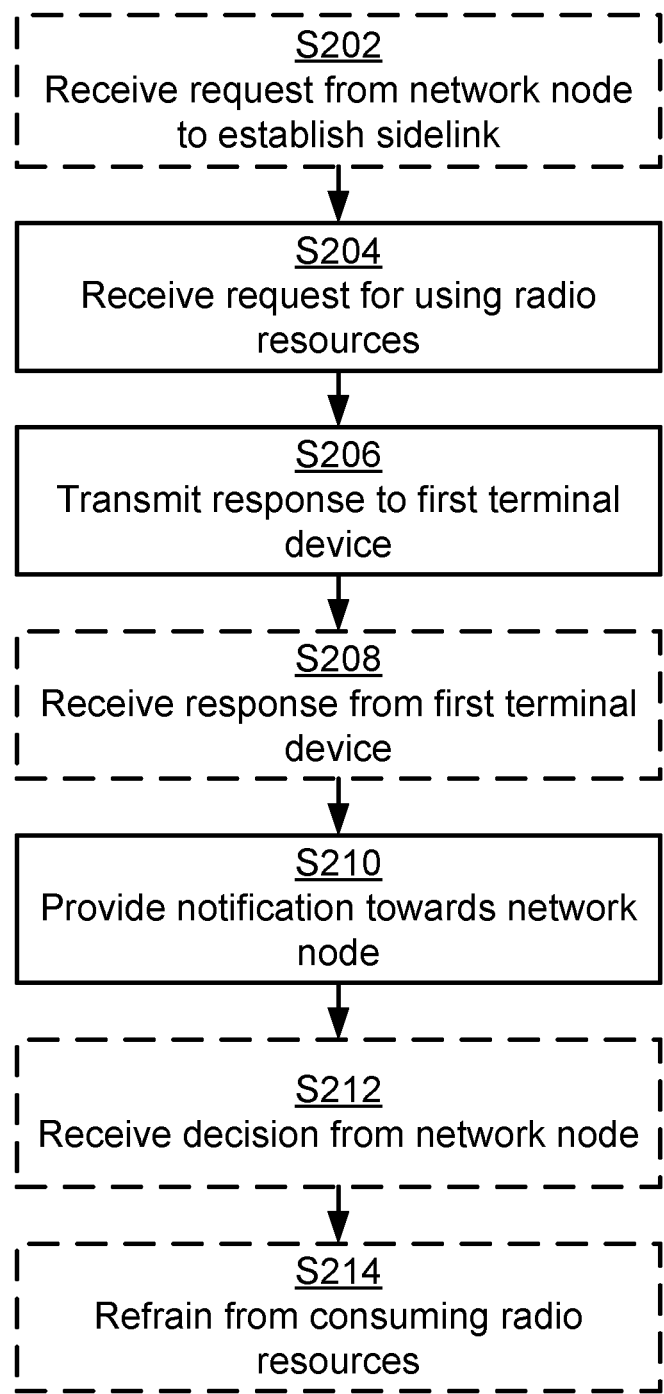

Reference is now made to FIG. 4 illustrating a method for granting radio resources to a first terminal device 200a as performed by the second terminal device 200b according to an embodiment.

As disclosed above, the first terminal device 200a requests extra radio resource from a peer terminal device, exemplified by the second terminal device 200b.

S204: The second terminal device 200b receives, via a sidelink 160 to the first terminal device 200a, a request for the first terminal device 200a to use radio resources allocated to the second terminal device 200b.

It is assumed that the second terminal device 200b responds to the first terminal device 200a.

S206: The second terminal device 200b transmits, via the sidelink 160, a response to the first terminal device 200a. The response pertains to whether the second terminal device 200b has granted the first terminal device 200a to use at least some of the requested radio resources or not.

A notification is then provided towards the network node 300 serving the second terminal device 200b.

S210: The second terminal device 200b provides, towards a network node 300 serving the second terminal device 200b, a notification of that the first terminal device 200a has requested the radio resources from the second terminal device 200b and/or of that the second terminal device 200b has granted the first terminal device 200a to use at least some of the requested radio resources.

Different examples of how the notification might be provided towards the network node 300 will be provided below.

Embodiments relating to further details of granting radio resources to a first terminal device 200a as performed by the second terminal device 200b will now be disclosed.

In some examples the sidelink 160 is established over interface PC5.

As disclosed above, in some aspects the sidelink 160 is not already established when the first terminal device 200a identifies the increasing need for use of radio resources. The sidelink 160 then needs to be established before the request in S204 is received. According to an embodiment the second terminal device 200b is therefore configured to perform (optional) step S202:

S202: The second terminal device 200b receives, from the network node 300, a request to establish the sidelink 160.

As disclosed above, in some aspects the response in S206 from the second terminal device 200b includes information of the amount of offered radio resources and/or of the time duration during which the offered radio resources might be used by the first terminal device 200a. In particular, according the response to the first terminal device 200a comprises information of amount of the radio resources granted to the first terminal device 200a and/or for how long time the radio resources are granted to the first terminal device 200a.

Further, the information of the amount of offered radio resources and/or of the time duration during which the offered radio resources might be used by the first terminal device 200a might be included in the notification in S210 provided towards the network node 300. That is, according to an embodiment, the notification in S210 provided towards the network node 300 comprises this information.

As disclosed above, in some aspects the offer comprises details of payment/remuneration between the first terminal device 200a and the second terminal device 200b. Particularly, according to an embodiment, the request in S204 comprises an offer for using radio resources allocated to the second terminal device 200b and the second terminal device 200b is configured to perform (optional) step S208:

S208: The second terminal device 200b receives, via the sidelink 160, a response from the first terminal device 200a. The response comprises at least a partial acceptance of the offer.

The notification in S210 to the network node 300 might then include information of acceptance of the offer. In particular, according to an embodiment, the notification in S210 provided towards the network node 300 comprises the at least partial acceptance of the offer.

There could be different ways for the second terminal device 200a to provide the notification in S210. Different aspects relating thereto will now be disclosed in detail.

According to a first aspect the notification is in S210 provided by being transmitted directly to the network node 300, without being transmitted via the first terminal device 200a. That is, according to an embodiment, the notification is in S210 provided towards the network node 300 by being transmitted directly to the network node 300 from the second terminal device 200b.

In this case the notification might comprise an encrypted, or otherwise protected, secret, such as a key, that is shared by the network node 300 and the first terminal device 200a but not known by the second terminal device 200b that will ensure the network node 300 that the first terminal device 200b has agreed to the offer of the requested radio resources as given by the second terminal device 200b. That is, according to an embodiment, the response in S206 from the first terminal device 200a comprises a protected secret shared by the network node 300 and the first terminal device 200a but not known by the second terminal device 200b, and the notification in S210 comprises the protected secret.

According to a second aspect the notification is in S210 provided by being transmitted to the network node 300 via the first terminal device 200a. That is, according to an embodiment the notification is in S210 provided towards the network node 300 by being transmitted to the first terminal device 200a for forwarding therefrom to the network node 300.

In this case the notification might comprise an encrypted, or otherwise protected, secret, such as a key, that is shared by the network node 300 and the second terminal device 200b but not known by the first terminal device 200a that will ensure the network node 300 that the second terminal device 200b has agreed to offer the requested radio resources to the first terminal device 200a. That is, according to an embodiment, the notification in S210 comprises a protected secret shared by the network node 300 and the second terminal device 200b but not known by the first terminal device 200a.

As will be further disclosed below, the network node 300 determines whether to accept or reject the at least some of the requested radio resources to be granted to the first terminal device 200a. Particularly, according to an embodiment the second terminal device 200b is configured to perform (optional) step S212:

S212: The second terminal device 200b receives, from the network node 300, a decision pertaining to whether the network node 300 has accepted the at least some of the requested radio resources to be granted the first terminal device 200a or not.

The second terminal device 200b is then configured to act accordingly. Particularly, according to an embodiment the second terminal device 200b is configured to perform (optional) step S214:

S214: The second terminal device 200b refrains from consuming the at least some of the requested radio resources according to the decision.

Figure 5:
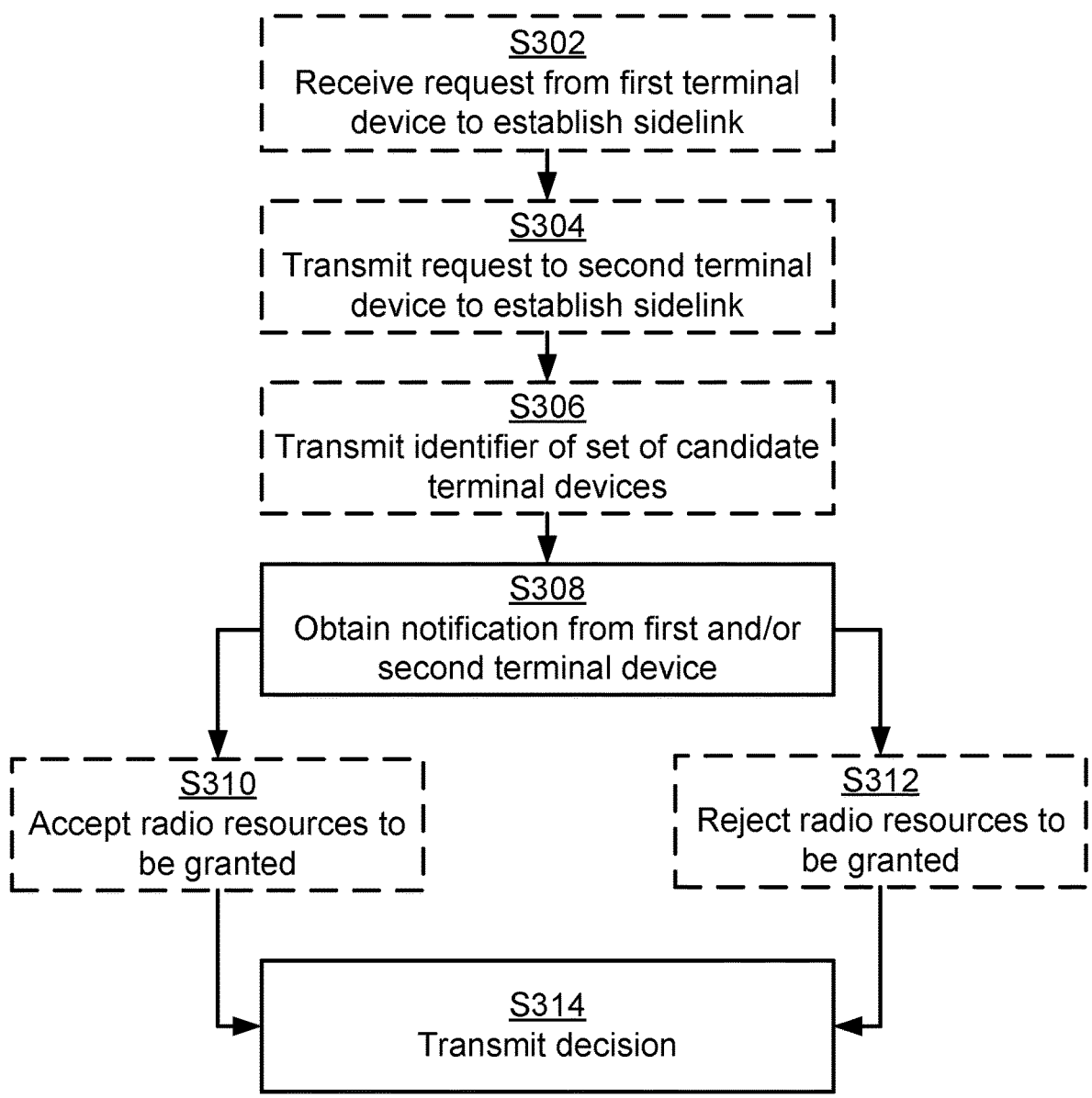

Reference is now made to FIG. 5 illustrating a method for handling radio resources between a first terminal device 200a and a second terminal device 200b as performed by the network node 300 according to an embodiment.

As disclosed above, a notification pertaining to whether the second terminal device 200b has granted the first terminal device 200a to use at least some of the requested radio resources or not is provided towards the network node 300.

S308: The network node 300 obtains, from a least one of the first terminal device 200a served by the network node 300 and the second terminal device 200b served by the network node 300, a notification of that the first terminal device 200a has requested radio resources from the second terminal device 200b where the radio resources have been allocated to the second terminal device 200b, and/or of that the second terminal device 200b has granted the first terminal device 200a to use at least some of the requested radio resources.

The network node 300 then responds with a decision regarding whether to accept or reject the at least some of the requested radio resources to be granted the first terminal device 200a.

S314: The network node 300 transmits, to at least one of the first terminal device 200a and the second terminal device 200b, a decision pertaining to whether the network node 300 has accepted the at least some of the requested radio resources to be granted the first terminal device 200a or not.

Embodiments relating to further details of handling radio resources between a first terminal device 200a and a second terminal device 200b as performed by the network node 300 will now be disclosed.

As disclosed above, in some aspects the notification in S308 might include information of acceptance of an offer. In particular, according to an embodiment the notification in S308 comprises at least a partial acceptance of an offer of the first terminal device 200a for using radio resources allocated to the second terminal device 200b.

As further disclosed above, in some aspects the notification in S308 might include information of the amount of offered radio resources and/or of the time duration during which the offered radio resources might be used by the first terminal device 200a. In particular, according to an embodiment the notification in S308 comprises information of amount of the radio resources granted to the first terminal device 200a and/or for how long time the radio resources are granted to the first terminal device 200a.

As further disclosed above, in some aspects the sidelink 160 is not already established when the first terminal device 200a identifies the increasing need for use of radio resources. Particularly, according to an embodiment the network node 300 is configured to perform (optional) steps S302, S304:

S302: The network node 300 receives, from the first terminal device 200a, a request to establish the sidelink 160; and in response thereto:

S304: The network node 300 transmits, at least to the second terminal device 200b, a request to establish the sidelink 160.

It is thus assumed that both the first terminal device 200a and the second terminal device 200b are requested, or even instructed or ordered, to establish the sidelink 160. The request might further comprise instructions for the first terminal device 200a and the second terminal device 200b to not use uplink resources when transmission over the sidelink 160 is expected to be received.

As further disclosed above, in some aspects the request in S302 to establish the sidelink 160 includes information of the network service for which the radio resource are to be used by the terminal device 200. Particularly, according to an embodiment, the request to establish the sidelink 160 comprises an indication of which network service the increasing need for use of radio resources results from.

In some aspects the request in S304 to establish the sidelink 160 is transmitted to more than one potential second terminal device. In particular, according to an embodiment, the request to establish the sidelink 160 is transmitted to a set of candidate terminal devices, and the network node 300 is configured to perform (optional) step S306:

S306: The network node 300 transmits, to the first terminal device 200a, an identifier of the set of candidate terminal devices.

There could be different ways for the network node 300 to determine which terminal devices to include in the set of candidate terminal devices. As will be further disclosed next, in some aspects the set of candidate terminal devices is based on their radio conditions, capabilities, and which network service the first terminal device 200a is to use, etc. Particularly, according to an embodiment, the set of candidate terminal devices is selected based on at least one of: their radio conditions, their capabilities, and which network service the requested radio resources are to be used by the first terminal device 200a. Further examples thereof will now be disclosed In some aspects the network node 300 considers which second terminal devices 200b to inform of an incoming sidelink transmission over the PC5 interface by considering their corresponding weights in the scheduling process.

For example, the network node 300 could indicate the resource allocations of radio resources for the considered announcing and monitoring terminal devices by creating a list of potential second terminal devices 200b with respect to radio measures relevant for scheduling bandwidth prioritization, such as measurements of reference signal received power (RSRP), signal plus interference and noise ratio (SINR), modulation and coding scheme (MCS), channel quality indicator (CQI), transmission rank, etc. The network node 300 could then select a set of potential second terminal devices 200b among the terminal devices 200b present in the scheduling evaluations of the network node 300 such that the potential second terminal devices 200b will have an opportunity to provide radio resources to the first terminal device 200a. This could reduce the risk of a second terminal devices 200b beings selected that has little or no priority in the ongoing scheduling evaluations.

In some aspects the network node 300 considers which device category (such as UE category) the potential second terminal devices 200b belong to. For example, the network node 300 could consider their respective capabilities in terms of number of transmit/receive antennas, MCS, multiple input multiple output (MIMO) and transmission rank capability, QoS capabilities, maximum uplink/downlink throughput, etc. As an example, if the first terminal device 200a is of lower device category and/or has lower capabilities than the second terminal device 200b, only requested radio resources corresponding to the category and/or capabilities of the first terminal device 200a might be granted to the first terminal device 200a, which might enable surplus radio resources to be granted from the second terminal device 200b to a yet further terminal device, if needed.

In some aspects the request from the first terminal device 200a to establish the sidelink 160 comprises information about whether the requested radio resource are to be used for uplink communication or downlink communication. In some aspects the network node 300 thus considers what link direction (i.e., uplink or downlink) the requested radio resource are to be used for by the first terminal device 200a. The network node 300 could then select a set of potential second terminal devices 200b by considering those potential second terminal devices 200b present in the scheduling evaluations of the network node 300 such that the potential second terminal devices 200b will have an opportunity to provide radio resources to the first terminal device 200a in the link direction requested by the first terminal device 200a. This could reduce the risk of a second terminal devices 200b beings selected that has little or no radio resource available in the link direction requested by the first terminal device 200a.

In some aspects the request from the first terminal device 200a to establish the sidelink 160 comprises an indication of which network service (such as mobile broadband, voice, streaming, etc.) the increasing need for use of radio resources results from. In some aspects the network node 300 thus considers what type of network service the requested radio resource are to be used for by the first terminal device 200a. The network node 300 could then select a set of potential second terminal devices 200b by considering those potential second terminal devices 200b present in the scheduling evaluations of the network node 300 such that the potential second terminal devices 200b will have an opportunity to provide radio resources to the first terminal device 200a capable of supporting the requested network service. This could reduce the risk of a second terminal devices 200b beings selected that has not enough amount of radio resource available for the network service to be used by the first terminal device 200a.

As the skilled person understands the request from the first terminal device 200a might comprise an indication of two or more network services the increasing need for use of radio resources results from, and where the set of potential second terminal devices 200b is selected accordingly.

As the skilled person further understands, the above examples for selecting a set of potential second terminal devices 200b could be combined by the network node 300 considering two or more pieces of information (such as weights, category, link direction, network services).

In some aspects, the network node 300 determines whether to accept or reject the radio resources to be granted to the first terminal device 200a. In particular, according to a first embodiment the network node 300 is configured to perform (optional) step S310:

S310: The network node 300 accepts the at least some of the requested radio resources to be granted to the first terminal device 200a; or In particular, according to a second embodiment the network node 300 is configured to perform (optional) step S312:

S312: The network node 300 rejects the at least some of the requested radio resources to be granted the first terminal device 200a.

The decision is then transmitted as in above S314.

There could be different ways for the network node 300 to determine whether to accept (as in S310) or reject (as in S312) the at least some of the requested radio resources to be granted the first terminal device 200a.

When the notification in S308 is received (only) from the first terminal device 200a, the at least some of the requested radio resources are rejected to be granted to the first terminal device 200a when the notification fails to comprise a protected secret shared by the network node 300 and the second terminal device 200b but not known by the first terminal device 200a. The request might be granted, or at least be considered for further evaluation, when the notification comprises the protected secret.

When the notification in S308 is received (only) from the second terminal device 200b, the at least some of the requested radio resources are rejected to be granted to the first terminal device 200a when the notification fails to comprise a protected secret shared by the network node 300 and the first terminal device 200a but not known by the second terminal device 200b. The request might be granted, or at least be considered for further evaluation, when the notification comprises the protected secret.

When a separate instance of the notification in S308 is received from each of the first terminal device 200a and from the second terminal device 200b, the at least some of the requested radio resources are rejected to be granted the first terminal device 200a when the instances of the notification fail to match each other. The request might be granted, or at least be considered for further evaluation, when the instances of the notification match each other.

The further evaluation might relate to a policy decision for the first terminal device 200a and/or the second terminal device 200b, properties of a network subscription for the first terminal device 200a and/or the second terminal device 200b, etc. that might allow or not allow radio resources to be accepted from, or shared to, another terminal device.

Figure 6:
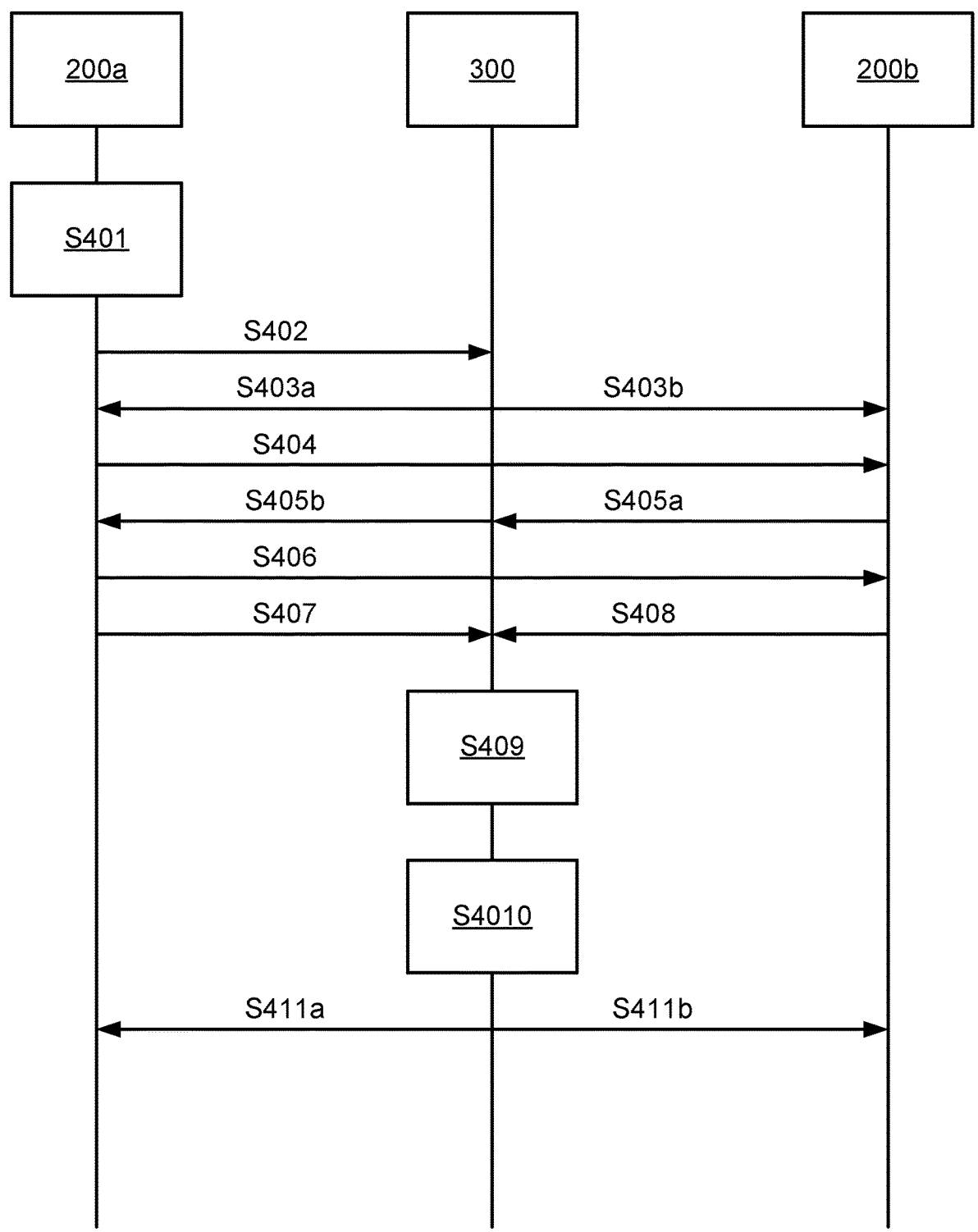
FIG. 6 is a signaling diagram of a method according to an embodiment.

One particular embodiment for handling radio resources between a first terminal device 200a and a second terminal device 200b based on at least some of the above disclosed embodiments will now be disclosed in detail with reference to the signaling diagram of FIG. 6. According to this embodiment, the first terminal device 200a sends via a D2D application a request to other D2D-capable terminal devices (as symbolized by the second terminal device 200b) in its vicinity (via the PC5 interface) to use a part of the radio resources (specified in term of duration, bandwidth, throughput, etc.) of these other terminal devices. The other part either accepts or rejects the request and information of this is sent to the first terminal device 200a and their serving network node 300.

S401: First terminal device 200a considers its current cellular performance non-adequate (considering adequate radio quality but still poor throughput, i.e. due to high cell load) and decides to request potential other terminal devices in its vicinity to request a specified share of their radio resources, for example described in terms of a specified duration in time, bandwidth, application throughput, number of delivered bits, etc.

S402: First terminal device 200a requests its serving network node 300 for a sidelink transmission to contact other terminal devices 200b to request extra radio resources from them.

S403a, S403b: first terminal device 200a indicates resource allocations for the considered announcing and monitoring terminal devices.

S404: First terminal device 200a requests, via the sidelink, resources from the listening terminal devices (implicitly selected by the serving network node 300). For example, first terminal device 200a might provide a request with an offer for radio resource corresponding to specified duration in time, bandwidth, application throughput, number of delivered bits, etc. and optionally a renumeration offer for the radio resource.

S405a, S405b: First terminal device 200a responds to first terminal device 200a with either an acknowledgement (ACK) or a negative acknowledgement (NACK) to the request whereby first terminal device 200a in turn is prompted with an ACK/NACK, potentially including a partial agreement of the offer (in terms of offered radio resources, demand for renumeration, etc.), potentially including an alternative to the offer (in terms of offered radio resources, demand for renumeration, etc.).

S406: First terminal device 200a selects one offer and replies to second terminal device 200b with an agreement.

S407: First terminal device 200a sends a Requester Payment Agreed Message (R-PAM), including information of second terminal device 200b and terms, e.g. duration, of contract, etc. to the serving network node 300.

S408: Second terminal device 200b sends a Provider Payment Agreed Message (P-PAM), including information of second terminal device 200b and duration of the contract, etc. to the serving network node 300.

S409: Network node 300 checks presence and validity of both R-PAM and P-PAM. If both are found valid the network node 300 re-allocates scheduled radio resources of second terminal device 200b to first terminal device 200a for the time period agreed in the contract. If at least one is found invalid the network node 300 dismisses the request. With frequent mismatches between observed R-PAM and P-PAM, either first terminal device 200a or second terminal device 200b could be blocked/listed/black-listed/put-on-monitor for further considerations.

S410: Network node 300 releases second terminal device 200b from the contract after duration of contract time has passed (possibly in combination with some utilized measure of used radio resources).

S411a, S411b: Network node 300 informs first terminal device 200a and second terminal device 200b of the termination of the contract.

Figure 7:
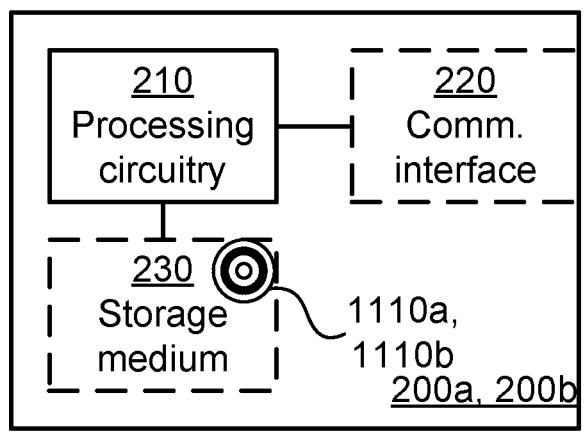
FIG. 7 is a schematic diagram showing functional units of a terminal device according to an embodiment.

FIG. 7 schematically illustrates, in terms of a number of functional units, the components of a terminal device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200a, 200b to perform a set of operations, or steps, as disclosed above. For example, the storage medium 230 may store the set of operations, and the processing circuitry 210 may be configured to retrieve the set of operations from the storage medium 230 to cause the terminal device 200a, 200b to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200a, 200b may further comprise a communications interface 220 for communications with network node 300, ProSe server 170, other terminal devices 200a, 200b, etc. in the communication network 100a, 100b. As such the communications interface 220 may comprise one or more transmitters and receivers, comprising analogue and digital components.

The processing circuitry 210 controls the general operation of the terminal device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the terminal device 200a, 200b are omitted in order not to obscure the concepts presented herein.

Figure 8:
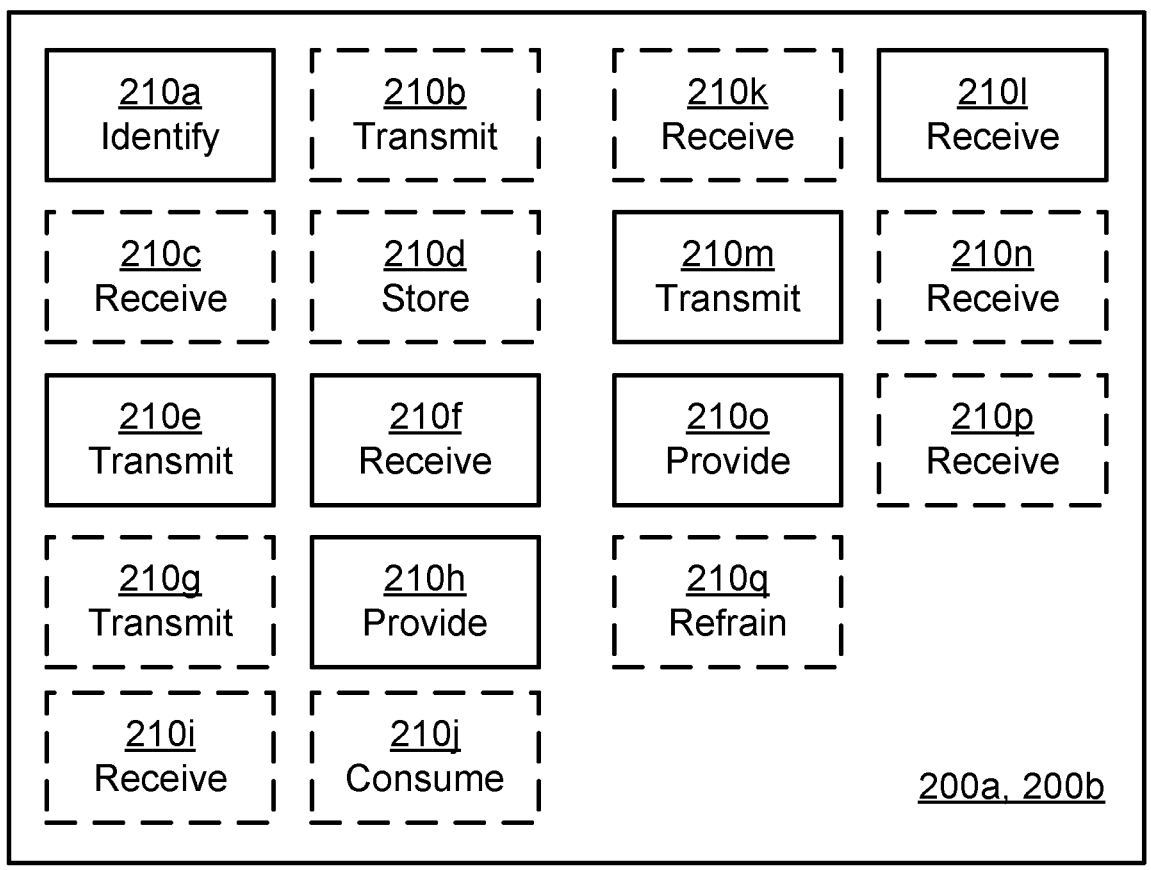
FIG. 8 is a schematic diagram showing functional modules of a terminal device according to an embodiment.

FIG. 8 schematically illustrates, in terms of a number of functional modules, the components of a terminal device 200a, 200b according to an embodiment.

When acting as a first terminal device 200a, the terminal device 200a comprises an identity module 210a configured to perform step S102, a transmit module 210e configured to perform step S110, a receive module 310f configured to perform step S112, and a provide module 310h configured to perform step S116. When acting as a first terminal device 200a, the terminal device 200a may further comprise a number of optional functional modules, such as any of a transmit module 210b configured to perform step S104, a receive module 210c configured to perform step S106, a store module 210d configured to perform step S108, a transmit module 210g configured to perform step S114, a receive module 210i configured to perform step S118, and a consume module 210j configured to perform step S120.

When acting as a second terminal device 200b the terminal device 200b comprises a receive module 210l configured to perform step S204, a transmit module 210m configured to perform step S206, and a provide module 210o configured to perform step S210. When acting as a second terminal device 200b the terminal device 200b may further comprise a number of optional functional modules, such as any of a receive module 210k configured to perform step S202, a receive module 210n configured to perform step S208, a receive module 210p configured to perform step S212, and a refrain module 210q configured to perform step S214.

In general terms, each functional module 210a-210q may be implemented in hardware or in software. Preferably, one or more or all functional modules 210a-210q may be implemented by the processing circuitry 210, possibly in cooperation with the communications interface 220 and the storage medium 230. The processing circuitry 210 may thus be arranged to from the storage medium 230 fetch instructions as provided by a functional module 210a-210q and to execute these instructions, thereby performing any steps of the terminal device 200a, 200b as disclosed herein.

Figure 9:
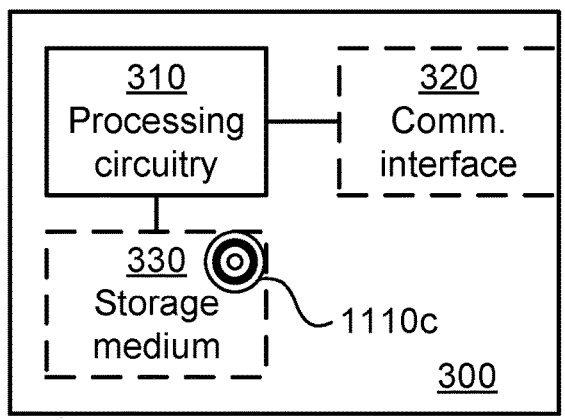
FIG. 9 is a schematic diagram showing functional units of a network node according to an embodiment.

FIG. 9 schematically illustrates, in terms of a number of functional units, the components of a network node 300 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1110c (as in FIG. 11), e.g. in the form of a storage medium 430. The processing circuitry 410 may further be provided as at least one application specific integrated circuit (ASIC), or field programmable gate array (FPGA).

Particularly, the processing circuitry 410 is configured to cause the network node 300 to perform a set of operations, or steps, as disclosed above. For example, the storage medium 430 may store the set of operations, and the processing circuitry 410 may be configured to retrieve the set of operations from the storage medium 430 to cause the network node 300 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 420 for communications with other entities, functions, nodes, servers, and devices of the communication networks 100a, 100b. As such the communications interface 420 may comprise one or more transmitters and receivers, comprising analogue and digital components.

The processing circuitry 410 controls the general operation of the network node 300 e.g. by sending data and control signals to the communications interface 420 and the storage medium 430, by receiving data and reports from the communications interface 420, and by retrieving data and instructions from the storage medium 430. Other components, as well as the related functionality, of the network node 300 are omitted in order not to obscure the concepts presented herein.

Figure 10:
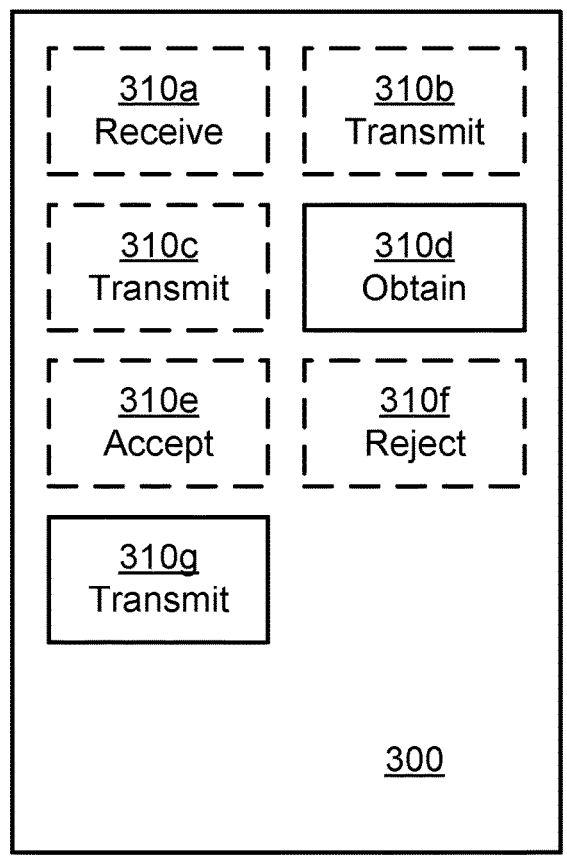
FIG. 10 is a schematic diagram showing functional modules of a network node according to an embodiment.

FIG. 10 schematically illustrates, in terms of a number of functional modules, the components of a network node 300 according to an embodiment. The network node 300 of FIG. 10 comprises a number of functional modules; an obtain module 310d configured to perform step S308, and a transmit module 310g configured to perform step S314. The network node 300 of FIG. 10 may further comprise a number of optional functional modules, such as any of a receive module 310a configured to perform step S302, a transmit module 310b configured to perform step S304, a transmit module 310c configured to perform step S306, an accept module 310e configured to perform step S310, and a reject module 310f configured to perform step S312.

In general terms, each functional module 310a-310g may be implemented in hardware or in software. Preferably, one or more or all functional modules 310a-310g may be implemented by the processing circuitry 410, possibly in cooperation with the communications interface 420 and the storage medium 430. The processing circuitry 410 may thus be arranged to from the storage medium 430 fetch instructions as provided by a functional module 310a-310g and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the first terminal device 200a may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the network node 300 may reside in the radio access network, such as in the radio access network node.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. x9 the processing circuitry 310 may be distributed among a plurality of devices, or nodes. The same applies to the functional modules 310a-310g of FIG. 30 and the computer programs 1120c of FIG. 11.

Figure 11:
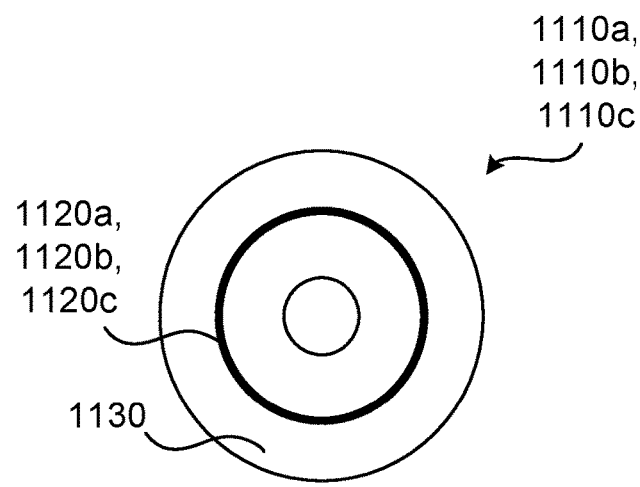
FIG. 11 shows one example of a computer program product comprising computer readable means according to an embodiment.

FIG. 11 shows one example of a computer program product 1110a, 1110b, 1110c comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the first terminal device 200a as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the second terminal device 200b as herein disclosed. On this computer readable means 1130, a computer program 1120c can be stored, which computer program 1120c can cause the processing circuitry 410 and thereto operatively coupled entities and devices, such as the communications interface 420 and the storage medium 430, to execute methods according to embodiments described herein. The computer program 1120c and/or computer program product 1110c may thus provide means for performing any steps of the network node 300 as herein disclosed.

In the example of FIG. 11, the computer program product 1110a, 1110b, 1110c is illustrated as an optical disc, such as a CD (compact disc) or a DVD (digital versatile disc) or a Blu-Ray disc. The computer program product 1110a, 1110b, 1110c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b, 1120c is here schematically shown as a track on the depicted optical disk, the computer program 1120a, 1120b, 1120c can be stored in any way which is suitable for the computer program product 1110a, 1110b, 1110c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for requesting radio resources from a second terminal device, the method being performed by a first terminal device, the method comprising:
identifying an increasing need for use of radio resources;
transmitting, via a sidelink to the second terminal device, a request for using radio resources allocated to the second terminal device;

receiving, via the sidelink, a response from the second terminal device, the response pertaining to whether the second terminal device has granted the first terminal device to use at least some of the requested radio resources or not; and providing, towards a network node serving the first terminal device, a notification of that the first terminal device has requested the radio resources from the second terminal device or of that the second terminal device has granted the first terminal device to use at least some of the requested radio resources.

2. The method according to claim 1, further comprising:
receiving, from the network node, a decision pertaining to whether the network node has accepted the at least some of the requested radio resources to be granted the first terminal device or not; and
consuming the at least some of the requested radio resources according to the decision.

3. The method according to claim 1, wherein the request comprises an offer for using radio resources allocated to the second terminal device, the method further comprising:
transmitting, via the sidelink, a response to the second terminal device, the response comprising at least a partial acceptance of the offer.

4. The method according to claim 3, wherein the notification provided towards the network node comprises the at least partial acceptance of the offer.

5. The method according to claim 1, wherein the response from the second terminal device comprises information of amount of the radio resources granted to the first terminal device or for how long time the radio resources are granted to the first terminal device.

6. The method according to claim 1, further comprising:
transmitting, to the network node, a request to establish the sidelink.

7. The method according to claim 6, wherein the request to establish the sidelink comprises an indication of which network service the increasing need for use of radio resources results from.

8. The method according to claim 6, further comprising:
receiving, from the network node, an identifier of a set of candidate terminal devices to which the sidelink can be established, and wherein the second terminal device is selected from the set of candidate terminal devices.

9. The method according to claim 8, further comprising:
storing the identifier of the set of candidate terminal devices.

10. The method according to claim 1, wherein the sidelink is established over interface PC5.

11. The method according to claim 1, wherein the radio resources are for cellular communication with the network node serving the first terminal device.

12. A method for granting radio resources to a first terminal device, the method being performed by a second terminal device, the method comprising:
receiving, via a sidelink to the first terminal device, a request for the first terminal device to use radio resources allocated to the second terminal device;
transmitting, via the sidelink, a response to the first terminal device, the response pertaining to whether the second terminal device has granted the first terminal device to use at least some of the requested radio resources or not; and
providing, towards a network node serving the second terminal device, a notification of that the first terminal device has requested the radio resources from the second terminal device or of that the second terminal device has granted the first terminal device to use at least some of the requested radio resources.

13. The method according to claim 12, further comprising:
receiving, from the network node, a decision pertaining to whether the network node has accepted the at least some of the requested radio resources to be granted the first terminal device or not; and
refraining from consuming the at least some of the requested radio resources according to the decision.

14. The method according to claim 12, wherein the request comprises an offer for using radio resources allocated to the second terminal device, the method further comprising:
receiving, via the sidelink, a response from the first terminal device, the response comprising at least a partial acceptance of the offer.

15. The method according to claim 12, wherein the notification provided towards the network node comprises the at least partial acceptance of the offer.

16. The method according to claim 12, wherein the response to the first terminal device comprises information of amount of the radio resources granted to the first terminal device or for how long time the radio resources are granted to the first terminal device.

17. A method for handling radio resources between a first terminal device and a second terminal device, the method being performed by a network node, the method comprising:
obtaining, from a least one of the first terminal device served by the network node and the second terminal device served by the network node, a notification of that the first terminal device has requested radio resources from the second terminal device where the radio resources have been allocated to the second terminal device, or of that the second terminal device has granted the first terminal device to use at least some of the requested radio resources; and
transmitting, to at least one of the first terminal device and the second terminal device, a decision pertaining to whether the network node has accepted the at least some of the requested radio resources to be granted the first terminal device or not.

18. A first terminal device for requesting radio resources from a second terminal device, the first terminal device comprising: processing circuitry, the processing circuitry being configured to cause the first terminal device to:
identify an increasing need for use of radio resources;
transmit, via a sidelink to the second terminal device, a request for using radio resources allocated to the second terminal device;
receive, via the sidelink, a response from the second terminal device, the response pertaining to whether the second terminal device has granted the first terminal device to use at least some of the requested radio resources or not; and
provide, towards a network node serving the first terminal device, a notification of that the first terminal device has requested the radio resources from the second terminal device or of that the second terminal device has granted the first terminal device to use at least some of the requested radio resources.

19. A second terminal device for granting radio resources to a first terminal device, the second terminal device comprising: processing circuitry, the processing circuitry being configured to cause the second terminal device to:

receive, via a sidelink to the first terminal device, a request for the first terminal device to use radio resources allocated to the second terminal device;

transmit, via the sidelink, a response to the first terminal device, the response pertaining to whether the second terminal device has granted the first terminal device to use at least some of the requested radio resources or not; and provide, towards a network node serving the second terminal device, a notification of that the first terminal device has requested the radio resources from the second terminal device or of that the second terminal device has granted the first terminal device to use at least some of the requested radio resources.

20. A network node for handling radio resources between a first terminal and a second terminal device, the network node comprising: processing circuitry, the processing circuitry being configured to cause the network node to:

obtain, from a least one of the first terminal device served by the network node and the second terminal device served by the network node, a notification of that the first terminal device has requested radio resources from the second terminal device where the radio resources have been allocated to the second terminal device, or of that the second terminal device has granted the first terminal device to use at least some of the requested radio resources; and transmit, to at least one of the first terminal device and the second terminal device, a decision pertaining to whether the network node has accepted the at least some of the requested radio resources to be granted the first terminal device or not.

\* \* \* \* \*